United States Patent Office 2,739,975
Patented Mar. 27, 1956

2,739,975

PROCESS OF HEAT BODYING DRYING OILS WITH POLYETHYLENE WAX AS A BODYING AGENT

William M. Gearhart and James D. Crowley, Kingsport, Tenn., assignors to Eastman Kodak Company, Rochester, N. Y., a corporation of New Jersey No Drawing. Application May 11, 1953,
Serial No. 354,412

4 Claims. (Cl. 260—407)

This invention relates to the heat-bodying of drying oils. More particularly, it relates to a method of accelerating the heat-bodying of linseed oil and other drying oils having heat-bodying characteristics similar to those of linseed oil, and obtaining products with advantageous properties.

In the paint and varnish industry, it is customary to heat-body drying oils by heating the oil in a kettle until it has attained the desired degree of viscosity. The heating brings about an increase of the molecular weight of the oil, which not only results in an increase in viscosity of the oil, but also yields a more chemically resistant and water resistant film on drying of the oil. The heat bodied oil is used in the preparation of exterior house paints, linoleum coating, varnish, printing ink, and other coatings. A high viscosity is desirable because it decreases penetration of the coating into such porous materials as wood, paper, or leather, and gives greater build to the coating.

Tung oil and oiticia oil heat-body very rapidly; in fact, the heat-bodying of these oils requires very careful control to prevent gelation. One the other hand, linseed oil and other drying oils having similar heat-bodying characteristics, such, for example, as perilla oil, heat-body much more slowly. For example, linseed oil may be bodied by heating at about 288° C. for approximately six hours.

It has been known to accelerate the heat-bodying of drying oils of the linseed oil type by adding a small amount, of the order of 1%, of anthraquinone before the cooking. The presence of 1% of anthraquinone in linseed oil will reduce the cooking time from six or seven hours to approximately two hours and fifteen minutes for an equivalent viscosity.

We have found that polyethylene wax accelerates the heat-bodying of drying oils of the linseed oil type, and gives bodied oils which in some respects are superior to those obtained without a bodying agent or with anthraquinone. For example, when 1% of polyethylene wax of molecular weight 1000–5000 is added to raw linseed oil and the oil is cooked at approximately 288° C., a viscosity is attained in one hour and forty minutes which is equal to that attained by heating raw linseed oil at 288° C. alone for six hours, or with 1% of anthraquinone for two hours and fifteen minutes. Not only does the polyethylene wax reduce the time required to body the oil, but it gives to the oil a thixotropic property not found in ordinary heat bodied oils. Moreover, after immersion in water of a film resulting from the drying of the bodied oil, a film of linseed oil bodied with the addition of 1% of polyethylene wax recovered its clarity much more rapidly than did films of linseed oil bodied without a bodying agent or with 1% of anthraquinone.

The presence of the wax in the oil retards the rate of drying very slightly, and penetration of porous substrates is somewhat greater in the case of oil bodied with wax than in the case of oil bodied with anthraquinone. On the other hand, oil bodied with polyethylene wax remains free from skinning after long periods of storage in contact with the atmosphere.

While we may use polyethylene wax of average molecular weight of from 1000 to 5000, we prefer to use polyethylene wax of average molecular weight of about 2000 to 4000.

The following examples illustrate the advantages of our invention.

EXAMPLE 1

Three portions of linseed oil, of "A" body, were heated at 288° C. ±10° C. with periodic viscosity checks. The first portion contained no bodying agent. The second sample contained 1% of anthraquinone. The third sample contained 1% of polyethylene wax, of average molecular weight between 2000 and 4000. The letters in Table I designate the body attained at the end of the heating time shown in the first horizontal line of the table, and their values are explained by Table II.

Table I

| Modification | Time in Minutes | | | | | | | |
|---|---|---|---|---|---|---|---|---|
| | 0 | 5 | 30 | 60 | 90 | 120 | 180 | 360 |
| Control | A | | C | F | G | J | P | Z1 |
| 1% Anthraquinone | A | | G | M | U | W | Z3 | |
| 1% Polyethylene Wax | A | H | U | W | Z | Z2 | Z4 | |

Table II

| Body: | Viscosity, poises |
|---|---|
| A | 0.50 |
| C | 0.85 |
| F | 1.40 |
| G | 1.65 |
| H | 2.00 |
| J | 2.50 |
| M | 3.20 |
| P | 4.00 |
| U | 6.27 |
| W | 10.70 |
| Z | 22.7 |
| Z1 | 27.0 |
| Z2 | 36.2 |
| Z3 | 46.3 |
| Z4 | 63.4 |

EXAMPLE 2

To each of the above bodied oils, 0.03% cobalt naphthenate and 0.05% lead naphthenate were added as driers, and the mixture was coated on a glass surface and allowed to dry for 48 hours. The coated glasses were then immersed in water for 48 hours. The coating from the oil bodied without bodying agent, and the coating from the oil bodied with anthraquinone, blushed upon immersion, and when removed from the water required several hours to recover their clarity. The coating from the oil bodied with polyethylene wax blushed upon immersion in water, but recovered its clarity in a few minutes after removal from the water.

EXAMPLE 3

All three of the above bodied oils were stored for one year, after which they were observed for skinning. It was observed that the oil bodied without bodying agent showed some skinning, and the oil bodied with anthraquinone had skinned over, while the oil bodied with polyethylene wax showed no skinning.

What we claim as our invention, and desire to be secured by Letters Patent of the United States is:

1. A process of heat-bodying a drying oil selected from the group consisting of linseed oil and other drying oils having heat-bodying characteristics similar to those of linseed oil, which comprises heating the oil in the presence of a small quantity, of the order of 1% of a polyethylene wax having an average molecular weight of between 1000 and 5000.

2. A process of heat-bodying a drying oil selected from the group consisting of linseed oil and other drying oils having heat-bodying characteristics similar to those of linseed oil, which comprises heating the oil in the presence of a small quantity, of the order of 1% of a polyethylene wax having an average molecular weight of between 2000 and 4000.

3. A process of heat-bodying linseed oil, which comprises heating the oil at a temperature of approximately 278°–298° C. in the presence of approximately 1% of a polyethylene wax having an average molecular weight of between 1000 and 5000.

4. A process of heat-bodying linseed oil, which comprises heating the oil at a temperature of approximately 278°–298° C. in the presence of approximately 1% of a polyethylene wax having an average molecular weight of between 2000 and 4000.

References Cited in the file of this patent

UNITED STATES PATENTS

| | | |
|---|---|---|
| 2,310,419 | Ginn | Feb. 9, 1943 |
| 2,316,187 | Pratt et al. | Apr. 13, 1943 |
| 2,473,798 | Kienle et al. | June 21, 1949 |
| 2,516,590 | Pratt | July 25, 1950 |